M. A. POSSONS.
METHOD OF FORMING SCREW THREADED OPENINGS IN GAS STOVE MANIFOLDS AND THE LIKE.
APPLICATION FILED DEC. 4, 1916.
1,264,854. Patented Apr. 30, 1918.
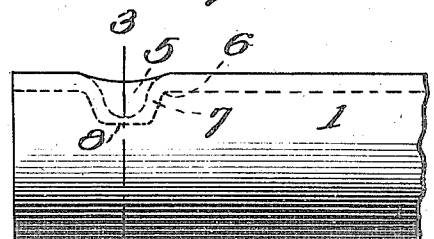
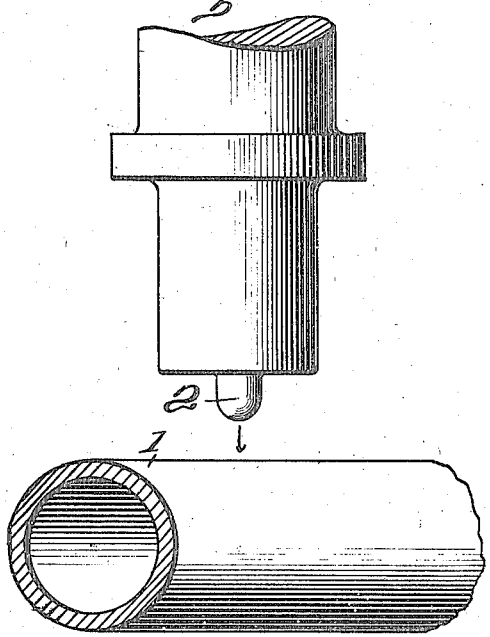
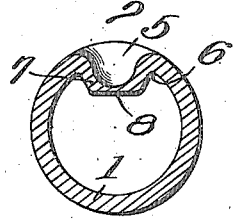
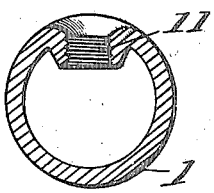
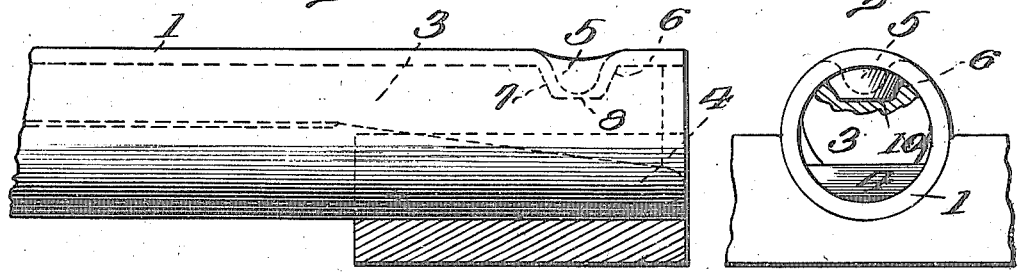
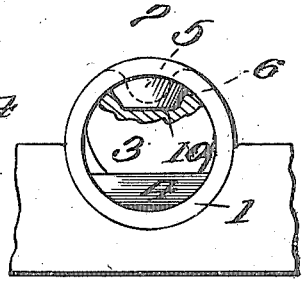
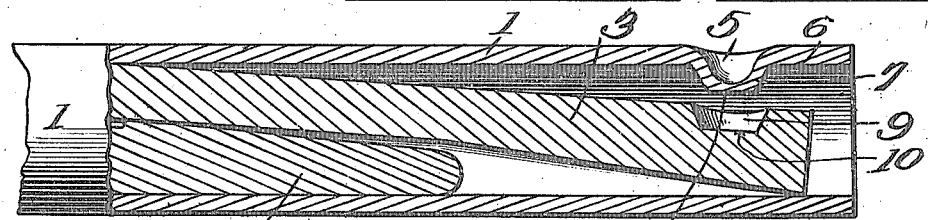
Inventor
M. A. Possons
By A. S. Pattison,
Attorney
Witnesses
Floyd P. Cornwall
L. L. Durket.

UNITED STATES PATENT OFFICE.

MINARD A. POSSONS, OF CLEVELAND, OHIO, ASSIGNOR TO AMERICAN STOVE COMPANY, OF ST. LOUIS, MISSOURI, A CORPORATION OF NEW JERSEY.

METHOD OF FORMING SCREW-THREADED OPENINGS IN GAS-STOVE MANIFOLDS AND THE LIKE.

1,264,854.  Specification of Letters Patent.  Patented Apr. 30, 1918.

Application filed December 4, 1916. Serial No. 134,964.

*To all whom it may concern:*

Be it known that I, MINARD A. POSSONS, a citizen of the United States, residing at Cleveland, in the county of Cuyahoga and State of Ohio, have invented certain new and useful Improvements in Methods of Forming Screw-Threaded Openings in Gas-Stove Manifolds and the like, of which the following is a specification, reference being had therein to the accompanying drawing.

This invention relates to a method of forming screw threaded openings in gas stove manifolds and the like, and the object of which is to provide the manifold with a screw threaded opening having a wall of greater depth than the thickness of the wall of the manifold itself.

In gas manifolds heretofore used where the burner nipples and other tubular connections therewith have a screw threaded connection of a depth only equal to the thickness of the wall of the tube forming the manifold, there has been great difficulty in making this screw threaded connection gas tight, owing to the fact that the wall of the tube or manifold is, in practice, not more than an eighth of an inch in thickness, thus providing the shallow screw threaded connections.

My present improvement is to provide a manifold or tube with an inwardly flanged tap opening, the flange increasing the depth of the screw threaded surface to about double the thickness of the wall of the tube or manifold, thus providing a sufficient depth of screw threaded surface to enable a reliable and effective screw threaded gas tight joint to be made.

My present invention consists further in the method of providing this increased depth of screw-threaded surface for the tapped openings of the pipe or manifold, which consists in forcing inward and stretching the wall of the tube forming an inwardly extending deep cavity from the outside, and an inwardly extending deep projection on the inner side of the tube, by the use of male and female dies, and then drilling or punching out the bottom and a part of the side of the wall of this cavity. This method elongates the wall of the tapped opening to about twice the thickness of the wall of the tube, and this opening is then screw-threaded, providing the necessary depth of screw-threaded tap or opening to enable a reliable gas-tight joint to be made.

In the accompanying drawings—

Figure 1 is a portion of a gas manifold, showing the first step in the carrying out of my invention.

Fig. 2 shows a portion of a gas-manifold and the cavity-forming and wall-stretching male die.

Fig. 3 is a section of Fig. 1 on the line 3—3.

Fig. 4 is a section showing the tapped opening screw-threaded.

Fig. 5 is a view showing in dotted lines the female die in place and the cavity formed in the manifold.

Fig. 6 is an end view of Fig. 5.

Fig. 7 is a longitudinal sectional view of the manifold showing the cavity formed therein and the female die released so that the manifold can be removed therefrom.

Referring now to the drawing, 1 is a portion of a tube from which a gas-manifold is to be formed and tapped, and 2 is the male die for pushing in and stretching the wall of the tube. A female die 3 is first placed within the tube 1 and is held in position against the wall of the tube by a wedge 4. Any suitable means may be used to force the wedge 4 in position and hold it there for locking the female die against the wall of the tube, and therefore mechanism for that purpose is not here shown, as it forms no part of my present invention.

The action of the dies is to stretch the wall of the tube 1 and form a deep inwardly extending cavity 5 and a corresponding deep inwardly extending projection 6. The side wall is stretched and made thinner as at 7 and the bottom of the cavity is stretched and made thinner as at 8. As shown, the cavity 9 in the female die 3 is provided with a flat bottom 10, whereas the end of the male die 2 is rounded and because of this construction the bottom of the cavity is rounded while the bottom of the projection 6 is made flat as at the thin portion 8, above referred to. This cavity having been formed by the pushing in and stretching of the wall of the tube 1, the bottom 8 is then either drilled or punched out and the opening then screw-threaded as at 11, which provides the manifold with an opening having an inwardly extending wall of a depth of about twice the thickness of the wall of the tube.

The tube from which the manifold is formed consists of a metal capable of being depressed and stretched as herein described, and the manifold when completed does not contain any external projection interfering with the rapid and cheap polishing thereof for use in the stove.

I am aware that other efforts have been made to provide an increased screw-threaded surface for the tapped openings for the gas manifolds, such, for instance, as that shown in Patent No. 1,146,664, dated July 13th 1915, to L. Stockstrom. This patented method, however, provides an external projection consisting of a specially constructed ring, and is quite different from my present improvement.

My improvement provides an effective and cheap way of furnishing the tapped openings of a gas manifold with sufficient screw-threaded surface to enable a reliable gas-tight joint to be made.

Of course it is to be understood that the herein disclosed process may be used with equally advantageous results in the manufacture of other articles than gas stove manifolds. The method may be used on flat as well as curved surfaces and in any instance where a screw-threaded opening of a greater length than the thickness of the metal in which the opening is made is desired.

Having thus described my invention, what I claim and desire to secure by Letters Patent is:

1. The method of providing a tubular gas manifold with an opening having an internal screw-threaded surface of greater depth than the thickness of the wall of the manifold, consisting in pushing and stretching the wall of the manifold inward forming an external cavity having a bottom and an internal projection, removing the bottom and a part of the side of the cavity and forming an opening and then screw-threading the internal side wall only of the opening.

2. The method of providing metal with an opening having an internal screw-threaded surface of greater depth than the thickness of the metal, consisting in pushing and stretching a portion of the metal inward forming a cavity with a bottom in the upper face, a projection on the lower face, the side of the bottom of the cavity rounded and the bottom of the cavity flat, removing the bottom and a part of the side of the cavity forming an opening and then screw-threading the internal wall of the opening.

3. The method of providing metal with an opening having an internal screw-threaded surface of greater depth than the thickness of the metal consisting in placing a member having a cavity with a flat bottom beneath the metal, pushing and stretching a portion of the metal into the said cavity with a rounded member thereby forming a cavity in the upper face, and a projection on the lower face, the side of the bottom of the cavity rounded and the bottom of the cavity flat, removing the bottom and a part of the side of the cavity forming an opening and then screw-threading the external wall of the cavity.

4. The method of providing metal with an opening having an external screw-threaded surface of greater depth than the thickness of the metal consisting in placing a member having a cavity beneath the member, pushing and stretching a portion of the metal into the said cavity and thereby forming a cavity in the upper face, a projection on the lower face, removing the bottom and a part of the side of the cavity forming an opening and then screw-threading the internal wall of the opening.

In testimony whereof I hereunto affix my signature in the presence of two witnesses.

MINARD A. POSSONS.

Witnesses:
F. T. BATCHELOR,
C. B. DIGBY.